US007016411B2

(12) United States Patent
Azuma et al.

(10) Patent No.: US 7,016,411 B2
(45) Date of Patent: Mar. 21, 2006

(54) IMAGE SIGNAL CODING METHOD, IMAGE SIGNAL CODING APPARATUS AND STORAGE MEDIUM

(75) Inventors: Takeo Azuma, Nara (JP); Kunio Nobori, Kadoma (JP); Kenya Uomori, Hirakata (JP); Atsushi Morimura, Nara (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 666 days.

(21) Appl. No.: 10/167,654

(22) Filed: Jun. 13, 2002

(65) Prior Publication Data

US 2003/0012277 A1 Jan. 16, 2003

(30) Foreign Application Priority Data

Jul. 4, 2001 (JP) ............................ 2001-203830

(51) Int. Cl.
*H04N 7/12* (2006.01)

(52) U.S. Cl. ............... 375/240.08; 382/154; 348/399.1

(58) Field of Classification Search ........... 375/240.08, 375/240.12, 240.24; 382/103, 154, 173, 382/162, 243; 348/43, 399.1, 417.1

See application file for complete search history.

(56) References Cited

U.S. PATENT DOCUMENTS

| | | | | |
|---|---|---|---|---|
| 6,301,382 | B1 * | 10/2001 | Smith et al. | 382/162 |
| 6,556,704 | B1 * | 4/2003 | Chen | 382/154 |
| 6,577,679 | B1 * | 6/2003 | Apostolopoulos | 375/240.12 |
| 6,625,310 | B1 * | 9/2003 | Lipton et al. | 382/173 |
| 6,870,945 | B1 * | 3/2005 | Schoepflin et al. | 382/103 |
| 6,873,723 | B1 * | 3/2005 | Aucsmith et al. | 382/154 |

FOREIGN PATENT DOCUMENTS

| | | |
|---|---|---|
| CN | 1233372 | 10/1999 |
| EP | 0717373 | 6/1996 |
| EP | 0921687 | 6/1999 |
| JP | 5-249953 | 9/1993 |
| JP | 8-182023 | 7/1996 |
| JP | 10155148 | 6/1998 |
| JP | 10214352 | 8/1998 |
| JP | 2000-148130 | 5/2000 |

OTHER PUBLICATIONS

English Language Abstract of JP 5-249953.
English Language Abstract of JP 10-155148.
English Language Abstract of JP 10-214352.
English Language Abstract of JP 2000-148130.
Burt et al., "Image Stabilization by Registration to a Reference Mosaic" Proc. ARPA Image Understanding Workshop, pp. 425-434, Nov. 10, 1994.

(Continued)

*Primary Examiner*—Gims Philippe
(74) *Attorney, Agent, or Firm*—Greenblum & Bernstein, P.L.C.

(57) ABSTRACT

Provided are a depth image obtaining section that obtains a depth image from the same viewpoint as in the input image, a layer section that separates the input image into a foreground image and a background image as layered images using depth information of the depth image, a coding section that encodes the foreground image, a background sprite generating section that generates a background sprite image from the background image, and a sprite coding section that encodes the background sprite image. The depth image from the same viewpoint as in the input image is obtained in the depth image obtaining section, the input image is separated into a foreground image and a background image as layered images using the depth information, and based on the separated background image, a background sprite image is generated.

10 Claims, 14 Drawing Sheets

OTHER PUBLICATIONS

Szeliski, "Video Mosaics for Virtual Environments", IEEE Computer Graphics and Applications, vol. 16, No. 2, Mar. 1996, pp. 22-30.

Irani et al., "Mosaic Based Representations of Video Sequences and Their Applications", Proc. 5th International Conference Computer Vision.1995, pp. 605-611.

Jaillon et al., "Image Mosiacking Applied to Three-Dimensional Surfaces", pp. 253-257; Proc. IEEE CVPR, Oct. 1994.

Wang et al., "Representing Moving Images with Layers", IEEE Transactions on Image Processing, 3(5): Sep. 1994, pp. 625-638.

* cited by examiner

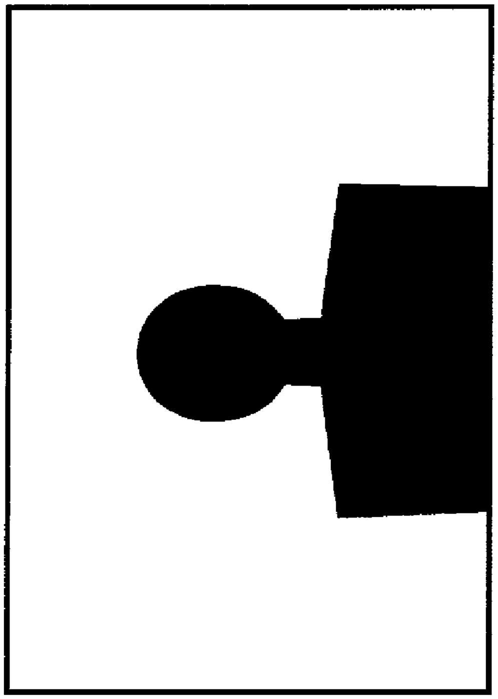
FIG.4B DEPTH IMAGE
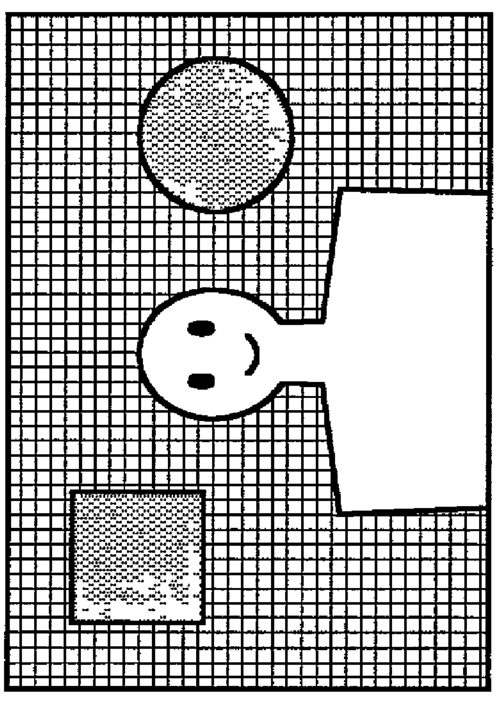
FIG.4A COLOR IMAGE

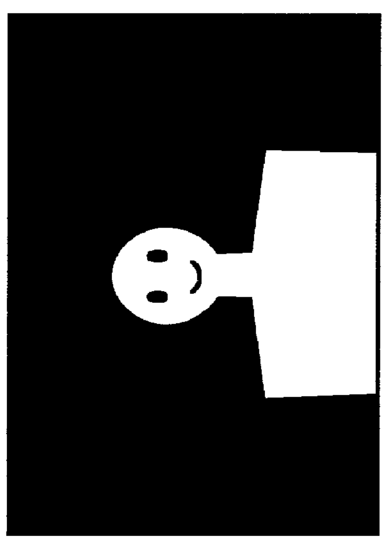
FIG.5A FOREGROUND IMAGE
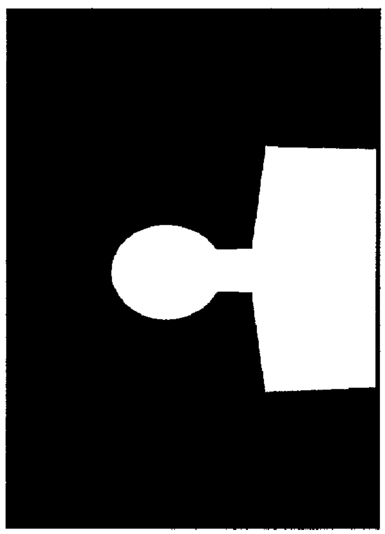
FIG.5B MASK IMAGE
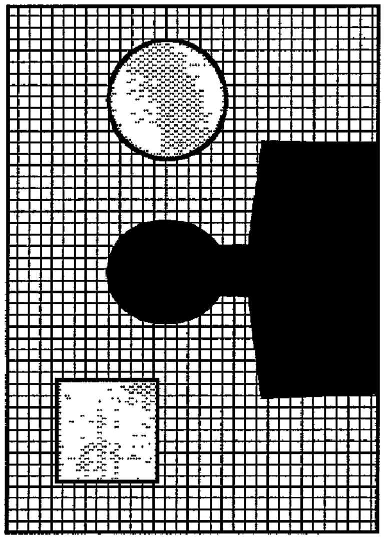
FIG.5C BACKGROUND IMAGE

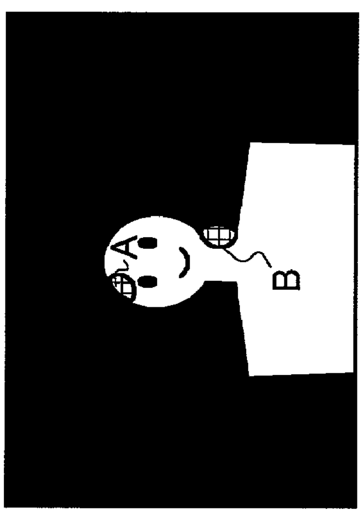
FIG.12A FOREGROUND IMAGE PRIOR TO THE REGION BOUNDARY CORRECTION
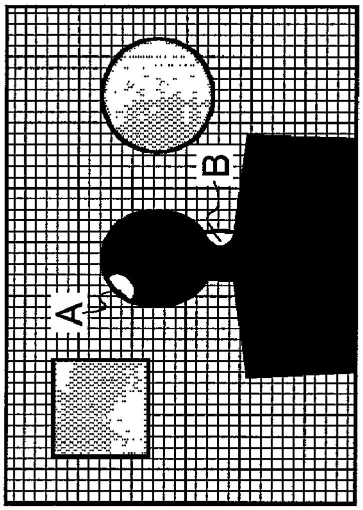
FIG.12B BACKGROUND IMAGE PRIOR TO THE REGION BOUNDARY CORRECTION
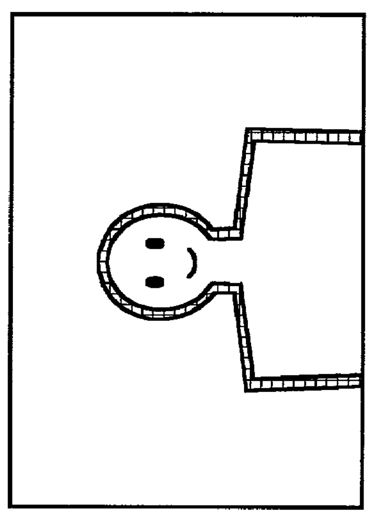
FIG.12C FOREGROUND IMAGE SUBJECTED TO THE REGION BOUNDARY CORRECTION
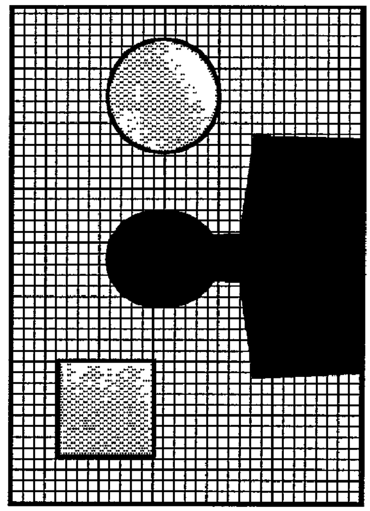
FIG.12D BACKGROUND IMAGE SUBJECTED TO THE REGION BOUNDARY CORRECTION

IMAGE SIGNAL CODING METHOD, IMAGE SIGNAL CODING APPARATUS AND STORAGE MEDIUM

BACKGROUND OF THE INVENTION

1. Field of the Invention

The present invention relates to an image signal coding method and apparatus that generate a sprite image from moving images.

2. Description of the Related Art

In recent years, sprite images have been used as a technique of achieving interactive graphical display on games and the internet. One of conventional techniques of generating a sprite image from moving images is described in JP2000-148130.

According to the description, a sprite image is generated as shown in FIG. 1. First, instep (hereinafter referred to as ST) 1, moving images including portions shot by camera operations such as panning and zooming are input. In ST2, global motion parameters (parameters representing the motion of the entire image) are extracted from the moving images. In ST3, a base frame for generating a sprite is determined in the moving images.

In ST4, predictive images are generated by operating the global motion parameters on frames except the base frame. In ST5 pixel values at sample points are calculated using pixel values in a plurality of other frames. Finally, in ST6, using the pixel values at the sample points calculated in ST6, images of the plurality of other frames each containing a predictive image are arranged for background of the base frame so that images are continuously connected.

However, in the above method, when the foreground has a motion different from the background, it is not possible to accurately estimate global motion parameters between images. As a result such a problem arises that a generated background sprite image is blurred.

SUMMARY OF THE INVENTION

It is an object of the present invention to provide a method and apparatus for generating a background sprite image with no blurs even when the foreground has a motion different from the background.

The object is achieved by acquiring a depth image from the same viewpoint as in an input image, and using the depth information, separating an input image into a foreground image and background image as layered images.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 4A is a diagram to explain a color image;

FIG. 4B is a diagram to explain a depth image;

FIG. 5A is a diagram showing a foreground image obtained by using depth information;

FIG. 5B is a diagram showing a mask image obtained by using the depth information;

FIG. 5C is a diagram showing a background image obtained by using the depth information;

FIG. 12A is a diagram showing a foreground image prior to region boundary correction;

FIG. 12B is a diagram showing a background image prior to the region boundary correction;

FIG. 12C is a diagram showing a foreground image subjected to the region boundary correction;

FIG. 12D is a diagram showing a background image subjected to the region boundary correction;

DETAILED DESCRIPTION OF THE PREFERRED EMBODIMENTS

Embodiments of the present invention will be described below with reference to accompanying drawings.

(Embodiment 1)

Figure 1:
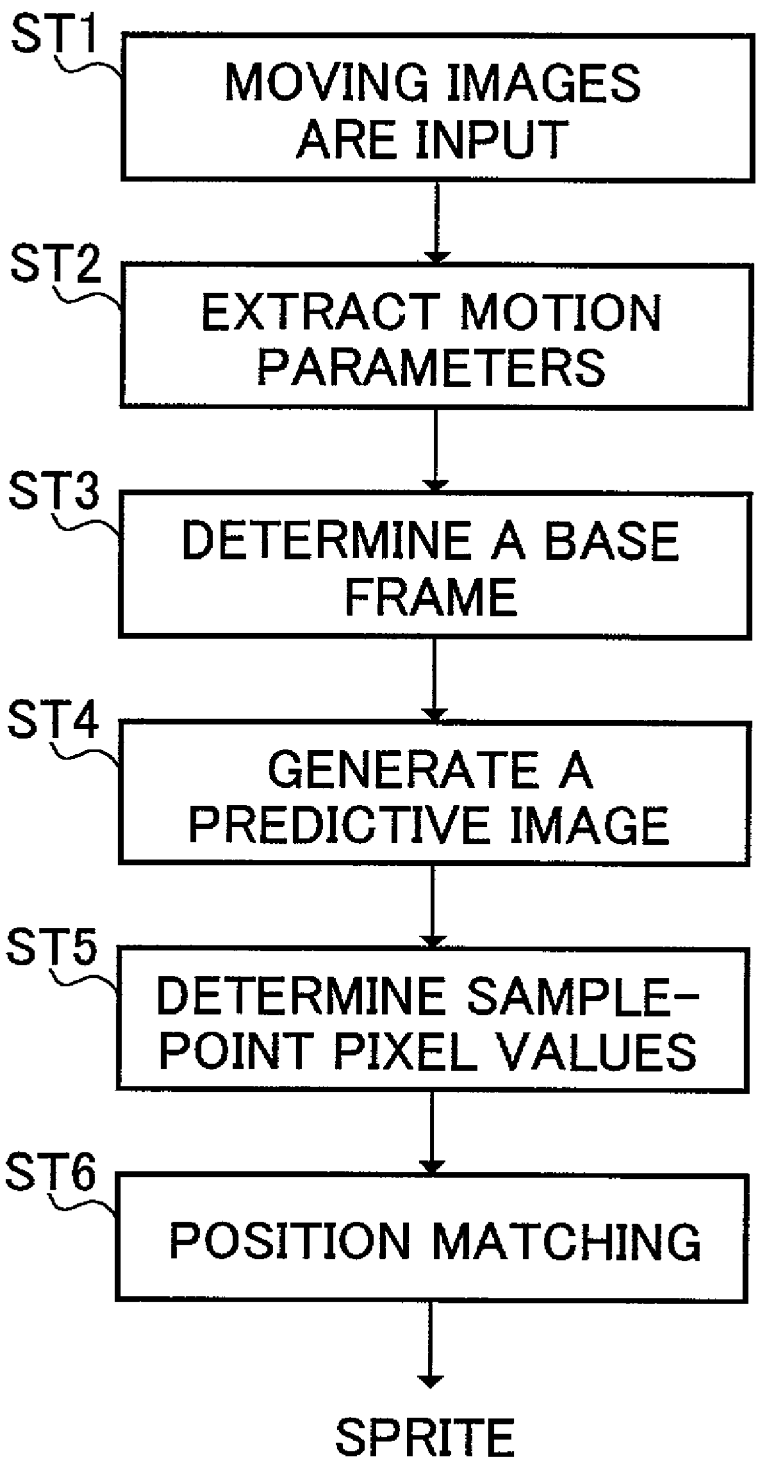
FIG. 1 is a flow chart showing processing procedures of a conventional sprite generating method.
Figure 2:
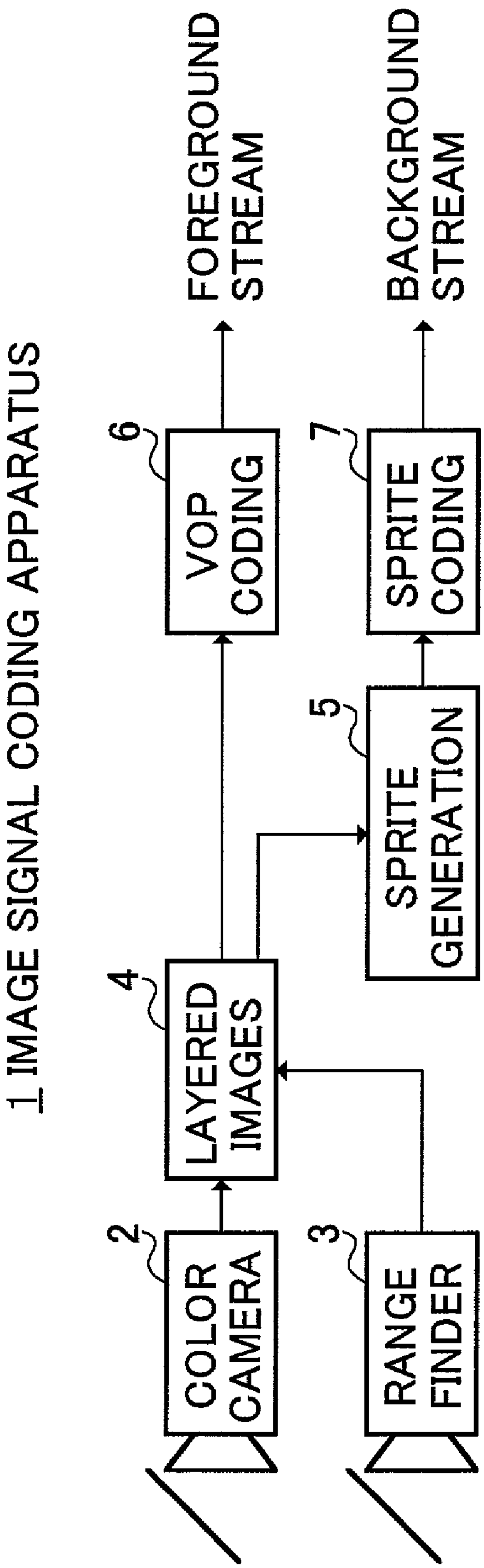
FIG. 2 is block diagram showing a configuration of an image signal coding method in Embodiment 1 of the present invention.

FIG. 2 shows a configuration of an image signal coding apparatus in Embodiment 1 of the present invention. In image signal coding apparatus 1, an input color image shot by color camera 2 is input to layer section 4, while a depth image shot by range finder 3 is input to layer section 4.

Figure 3:
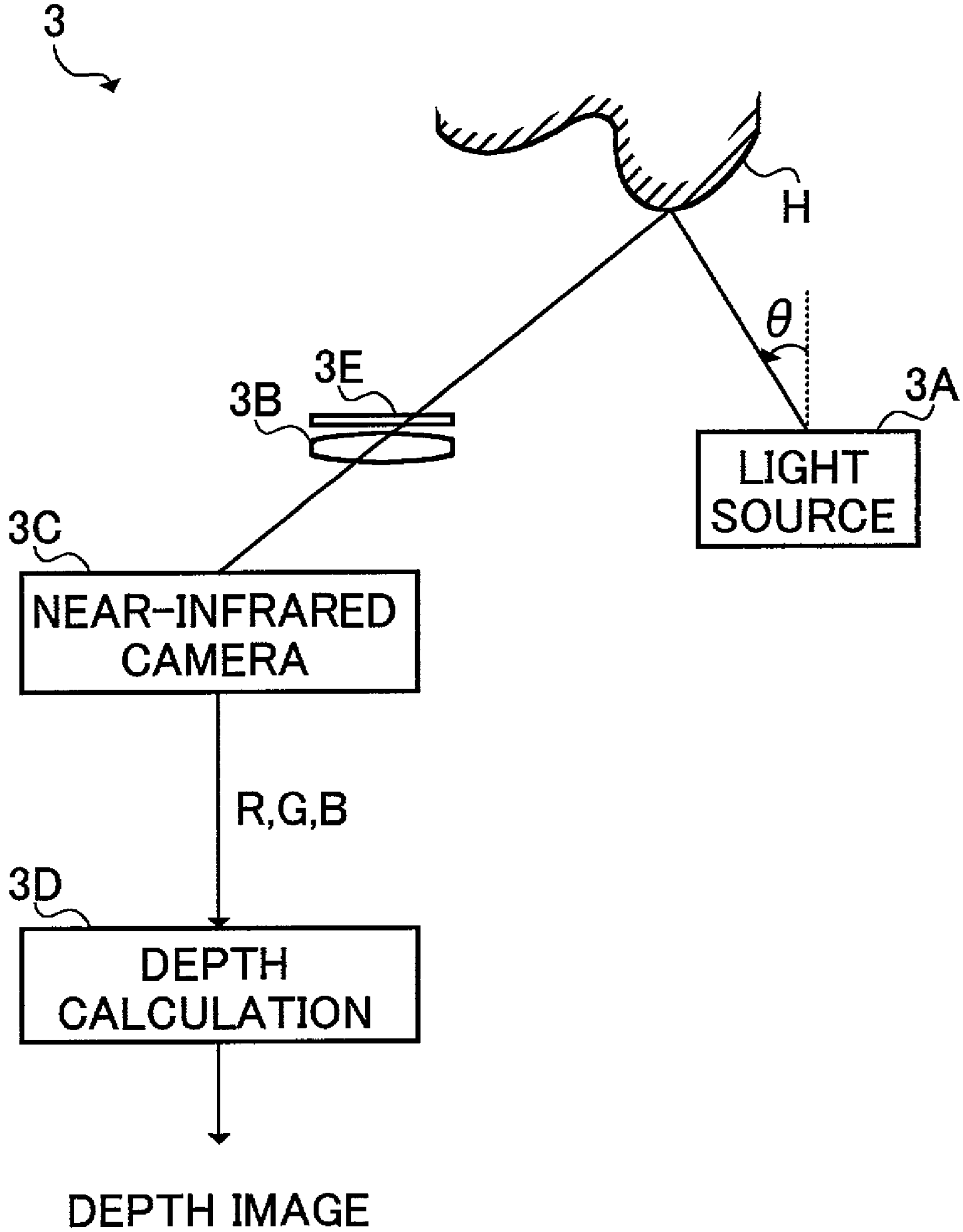
FIG. 3 is a block diagram showing a configuration of a range finder.

Range finder 3 outputs the depth image (image obtained by mapping depth values from the camera in pixel gray scale) from the same viewpoint as in the color image. FIG. 3 shows an example of a configuration of range finder 3. In range finder 3, light source section 3A irradiates object H with a near-infrared laser slit light, while the light is swept horizontally, and reflected lights from object H are picked up in near-infrared camera 3C through narrow-bandwidth optical filter (interference filter) 3E and lens 3B.

An output of near-infrared camera 3C is input to depth calculating section 3D. The sweeping of the slit light projects a pattern light by controlling light power of the light source corresponding to sweeping angle, or controlling sweeping speed corresponding to sweeping angle with constant light power of the light source. In the case of a gradient method for performing depth calculation from two light pattern images, by switching projection pattern lights alternately for each field, it is possible to calculate a depth image on a current field from images of a last field and current field.

Depth calculating section 3D analyzes the pattern light in an output image of near-infrared camera 3C, and detects projection direction θ of the slit light when the light reaches each pixel. Then, using the projection direction and position of the pixel, three-dimensional position of object H is calculated from the principal of triangulation. Based on the three-dimensional position, the depth image (image obtained by mapping depth values from the camera in pixel gray scale) is obtained.

Using the depth information from range finder 3, layer section 4 separates a color image into foreground and background as layered images. FIG. 4 shows examples of color image (FIG. 4A) and depth image shot from the same viewpoint. The depth image in FIG. 4B indicates that darker regions are closer to the camera, while brighter regions are farther from the camera. In FIG. 4B, the foreground region closer to the camera is dark, while the background region farther from the camera is light.

Layer section 4 forms images as shown in FIG. 5 as a result of layering using the depth image. In other words, FIG. 5A shows a foreground image obtained by extracting a region with depth values less than a threshold. In FIG. 5A a region with depth values not less than the threshold is indicated in black. FIG. 5B is a mask image. In FIG. 5B, a region with depth values less than the threshold is indicated in white, while the other region with depth values not less than the threshold is indicated in black. FIG. 5C shows a background image obtained by extracting a region with depth values not less than the threshold. In FIG. 5C, a region with depth values less than the threshold is indicated in black.

Thus, layer section 4 compares the input image obtained from color camera 2 with a threshold based on the depth information, and thereby separates the input image into the foreground image and background image as layered images. In this way, image signal coding apparatus 1 estimates global motion parameters, described later, with accuracy in the background region.

VOP (Video Object Plane) coding section 6 receives as its input time-series foreground images, performs VOP coding on the foreground images, and outputs a foreground stream. In other words, VOP coding section 6 performs coding on shape information and texture information for each video object plane. Identification of foreground and background in VOP coding section 6 may be performed by writing specific pixel values (for example, (R,G,B)=(0,0,0)) indicative of background in the foreground, or receiving in VOP coding section 6 both binary mask image and foreground image shown in FIG. 5B.

Figure 6:
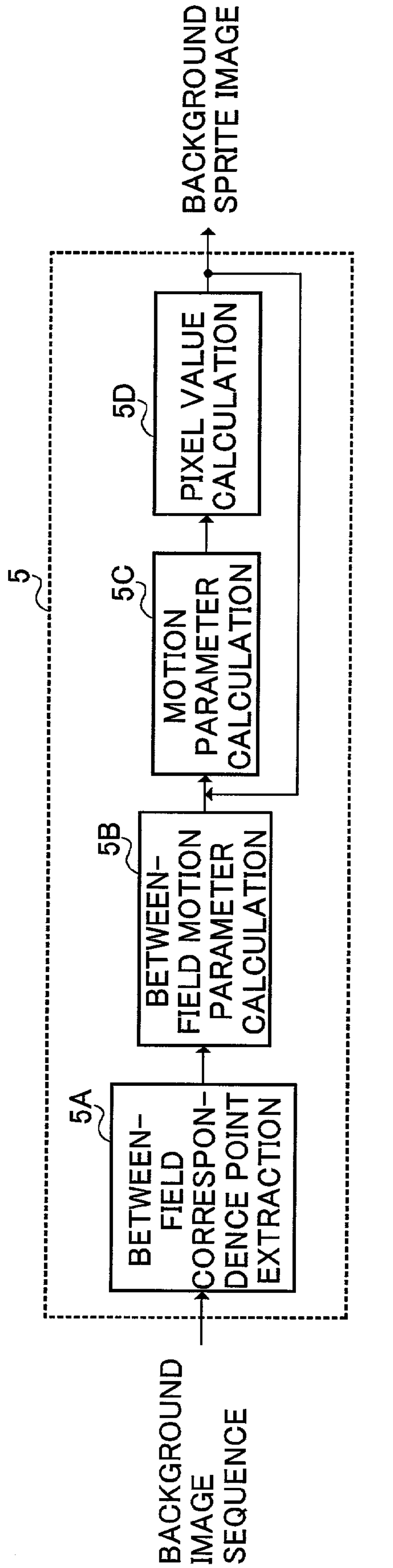
FIG. 6 is a block diagram showing a configuration of a sprite generating section.

Sprite generating section 5 receives as its input time-series background images and generates a background sprite image. Sprite generating section 6 is configured as shown in FIG. 6. The configuration of sprite generating section 5 will be described with reference to FIGS. 6 and 7. In sprite generating section 5, when a background image is input to between-field correspondence point extracting section 5A, the section 5A extracts a between-field correspondence point. Between-field motion parameter calculating section 5B determines motion parameters (shown as affine parameters in FIG. 7) between neighboring fields from the correspondence between neighboring fields.

Motion parameter calculating section 5C determines the relationship between each field and background spite from the relationship between a base field and background sprite image and the relationship between the base field and each field, and determines mapping in the sprite image from each field. Pixel value calculating section 5D calculates each pixel value in the background sprite image from values written in the background sprite image a plurality of times in the mapping.

In other words, in sprite generating section 5 between-field correspondence point extracting section 5A searches for a correspondence point between background regions of neighboring fields of background image sequence by block matching, etc. The search for the correspondence point is performed from the base field set in the sequence in the earlier and later time-based directions. As the base field, a time-based generally center field may be selected in the sequence for generating the background sprite image. The correspondence between images is evaluated by SSD indicated below.

$$SSD(u, v) = \sum_{i=-W/2}^{W/2} \sum_{j=-H/2}^{H/2} (I_2(x+i, y+j) - I_1(x+i+u, y+j+v))^2 \quad \text{Eq. (1)}$$

In equation (1), $I_1$ is intensity of a base image, $I_2$ is intensity of a reference image, W and H indicate respectively width and height of a block (window region) used in searching for the correspondence point, and x and Y indicate pixel coordinate values at a center position of a block set in the base image. The block in the base image is set to include a predetermined or more number of background pixels in the block. As the motion vector at (x,y) in the base image, SSD is calculated while varying u,v in a search region per pixel basis, and a pair of u,v (motion vector of pixel accuracy) that minimizes SSD is obtained. Next, in order to calculate motion vector of sub-pixel accuracy, u and v are corrected using the following equation in the vicinity of a minimum value of SSD calculated at one-pixel intervals. Taylor's expansion of the spatial distribution of SSD value in the vicinity of (x,y) obtains following equations.

$$\frac{\partial SSD(u+\Delta u, v+\Delta v)}{\partial u} = \frac{\partial SSD(u, v)}{\partial u} + \Delta x \frac{\partial^2 SSD(u, v)}{\partial u^2} + \Delta y \frac{\partial^2 SSD(u, v)}{\partial u \partial v} \quad \text{Eq (2)}$$

$$\frac{\partial SSD(u+\Delta u, v+\Delta v)}{\partial v} = \frac{\partial SSD(u, v)}{\partial v} + \Delta x \frac{\partial^2 SSD(u, v)}{\partial v \partial u} + \Delta y \frac{\partial^2 SSD(u, v)}{\partial v^2}$$

Under the condition that the value of SSD has a limit at a correspondence point, the following equation is obtained.

$$\begin{pmatrix} \Delta u \\ \Delta v \end{pmatrix} = -\begin{pmatrix} \frac{\partial^2 SSD(u, v)}{\partial u^2} & \frac{\partial^2 SSD(u, v)}{\partial u \partial v} \\ \frac{\partial^2 SSD(u, v)}{\partial v \partial u} & \frac{\partial^2 SSD(u, v)}{\partial v^2} \end{pmatrix}^{-1} \begin{pmatrix} \frac{\partial SSD(u, v)}{\partial u} \\ \frac{\partial SSD(u, v)}{\partial v} \end{pmatrix} \quad \text{Eq (3)}$$

Thus, motion vector (u+Δu,v+Δv) of sub-pixel accuracy at (x,y) in the base image is calculated. According to the above procedures, a plurality of correspondence points between neighboring fields is calculated.

Between-field motion parameter calculating section 5B fits the global motion model to pairs of the plurality of correspondence points extracted in between-field correspondence point extracting section 5A, using the least square method. Herein, in order to simplify the description, the processing in the section 5B will be described when the global motion model is of affine transformation.

Assuming coordinates in the base image are (x,y) and coordinates in the reference image are (x',y'), Affine parameters are applied to n pairs of correspondence points $(x_0,y_0)$, $(x'_0,y'_0)$ . . . $(x_{n-1},y_{n-1})$, $(x'_{n-1},y'_{n-1})$. In other words, affine parameters a to f most fitting to following equation (4) are determined.

$$\begin{pmatrix} x'_0 & \cdots & x'_{n-1} \\ y'_0 & \cdots & y'_{n-1} \end{pmatrix} = \begin{pmatrix} a & b & c \\ d & e & f \end{pmatrix} \begin{pmatrix} x_0 & \cdots & x_{n-1} \\ y_0 & \cdots & y_{n-1} \\ 1 & \cdots & 1 \end{pmatrix} \quad \text{Eq (4)}$$

The fitting of affine parameters is evaluated using following equation (5).

$$J = \sum_{k=0}^{n-1} [\{x'_k - (ax_k + by_k + c)\}^2 + \{y'_k - (dx_k + ey_k + f)\}^2] \quad \text{Eq (5)}$$

Affine parameters a to f that minimize equation (5) are obtained by solving equation (7) under the condition of equation (6).

$$\begin{aligned}
\frac{\partial J}{\partial a} &= -2\sum_{k=0}^{n-1} x_k\{x'_k - (ax_k + by_k + c)\} = 0 \\
\frac{\partial J}{\partial b} &= -2\sum_{k=0}^{n-1} y_k\{x'_k - (ax_k + by_k + c)\} = 0 \\
\frac{\partial J}{\partial c} &= -2\sum_{k=0}^{n-1} \{x'_k - (ax_k + by_k + c)\} = 0 \\
\frac{\partial J}{\partial d} &= -2\sum_{k=0}^{n-1} x_k\{x'_k - (dx_k + ey_k + f)\} = 0 \\
\frac{\partial J}{\partial e} &= -2\sum_{k=0}^{n-1} y_k\{x'_k - (dx_k + ey_k + f)\} = 0 \\
\frac{\partial J}{\partial f} &= -2\sum_{k=0}^{n-1} \{x'_k - (dx_k + ey_k + f)\} = 0
\end{aligned} \quad \text{Eq (6)}$$

$$\begin{pmatrix}
\sum_{k=0}^{n-1} x_k^2 & \sum_{k=0}^{n-1} x_k y_k & \sum_{k=0}^{n-1} x_k & 0 & 0 & 0 \\
\sum_{k=0}^{n-1} x_k y_k & \sum_{k=0}^{n-1} y_k^2 & \sum_{k=0}^{n-1} y_k & 0 & 0 & 0 \\
\sum_{k=0}^{n-1} x_k & \sum_{k=0}^{n-1} y_k & \sum_{k=0}^{n-1} 1 & 0 & 0 & 0 \\
0 & 0 & 0 & \sum_{k=0}^{n-1} x_k^2 & \sum_{k=0}^{n-1} x_k y_k & \sum_{k=0}^{n-1} x_k \\
0 & 0 & 0 & \sum_{k=0}^{n-1} x_k y_k & \sum_{k=0}^{n-1} y_k^2 & \sum_{k=0}^{n-1} y_k \\
0 & 0 & 0 & \sum_{k=0}^{n-1} x_k & \sum_{k=0}^{n-1} y_k & \sum_{k=0}^{n-1} 1
\end{pmatrix}
\begin{pmatrix} a \\ b \\ c \\ d \\ e \\ f \end{pmatrix} =
\begin{pmatrix}
\sum_{k=0}^{n-1} x_k x'_k \\
\sum_{k=0}^{n-1} y_k x'_k \\
\sum_{k=0}^{n-1} x'_k \\
\sum_{k=0}^{n-1} x_k y'_k \\
\sum_{k=0}^{n-1} y_k y'_k \\
\sum_{k=0}^{n-1} y'_k
\end{pmatrix} \quad \text{Eq (7)}$$

When a result of the search for the corresponding point in between-field correspondence extracting section 5A contains an erroneous correspondence, the estimation error of affine parameters becomes large. In order to improve the error, an outlier of correspondence point is removed. In removing the outlier of correspondence point, using estimated affine parameter values a to f calculated from the plurality of correspondence points $(x_0,y_0)$, $(x'_0,y'_0)$ to $(x_{n-1},y_{n-1})$, $(x'_{n-1},y'_{n-1})$ and equation (7), the fitting accuracy of affine parameters at each correspondence point is evaluated using equations (8) and (9):

$$\begin{pmatrix} \Delta x'_i \\ \Delta y'_i \end{pmatrix} = \begin{pmatrix} x'_i \\ y'_i \end{pmatrix} - \begin{pmatrix} a & b & c \\ d & e & f \end{pmatrix} \begin{pmatrix} x \\ y \\ 1 \end{pmatrix} \quad \text{Eq (8)}$$

$$r_i = \sqrt{\Delta x'^2 + \Delta y'^2} \quad \text{Eq. (9)}$$

Then, an outlier is removed using $r_{AVE}+\sigma_r$ as a threshold, and affine parameters are fitted again to remaining pairs of correspondence points. Herein, $r_{AVE}$ is an average value of $r_i$, and $\sigma_r$ is standard deviation of $r_i$.

Figure 7:
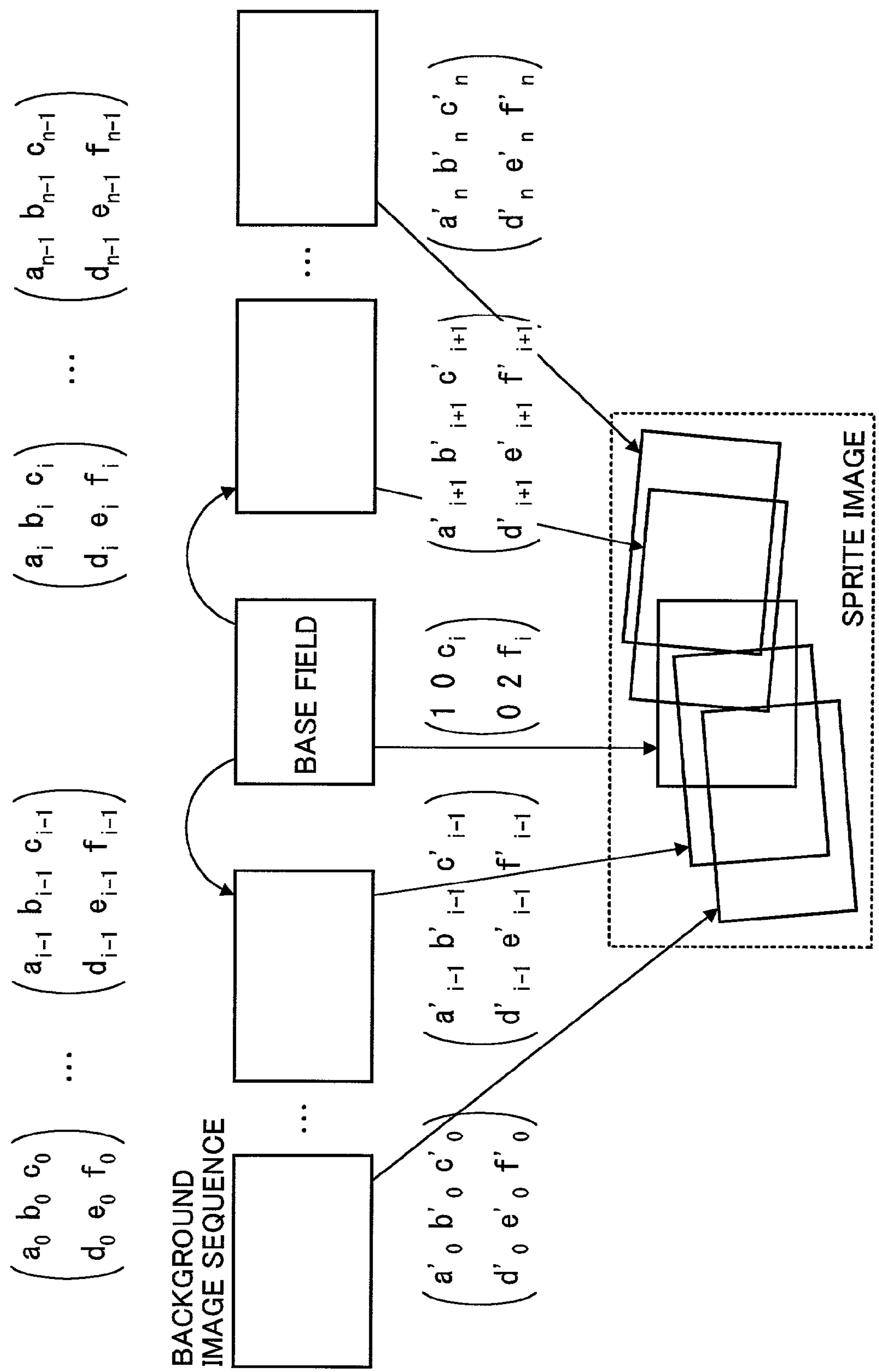
FIG. 7 is a diagram to explain generation of a background sprite.

Motion parameter calculating section 5C synthesizes using affine parameters between neighboring background fields calculated in between-field motion parameter calculating section 5B and affine parameters between the base field and sprite image (sprite image is extended two times in y-direction as shown in FIG. 7 because the sprite image is assumed to be a frame image), and thereby calculates affine parameters between each background field and sprite image.

Using the affine parameters between each background field and background sprite image, pixel value calculating section 5D maps each background field image in the background sprite image. As shown in FIG. 7, since background fields are mapped in the background sprite image while overlapping one another, the pixel value of the background sprite image is determined as an average value or median value with the overlapping considered.

By performing such processing, sprite generating section 5 generates a background sprite image from the background image sequence.

Sprite coding section 7 encodes fetch coordinates, called a sprite point, of each frame in the background sprite image, as well as the background sprite image, by sprite coding, and generates a background stream.

Figure 8:
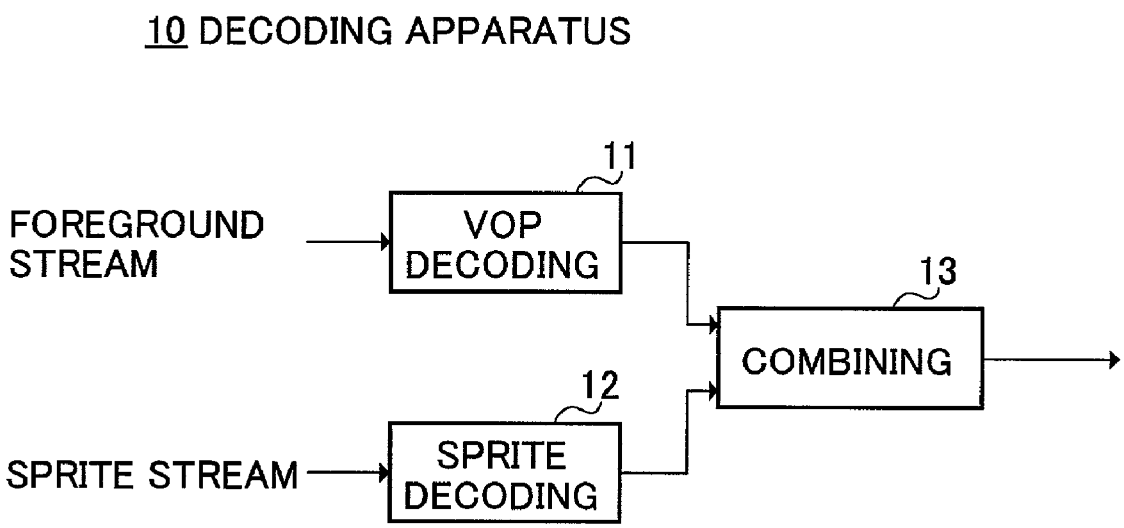
FIG. 8 is a block diagram showing a decoding apparatus.

FIG. 8 shows a configuration of decoding apparatus 10 that decodes a foreground stream and background stream generated in image signal coding apparatus 1. The foreground stream is decoded in VOP decoding section 1, while a sprite stream is decoded in sprite decoding section 12. Each decoded data is combined in combining section 13 to be a restored image.

In the above configuration, in image signal coding apparatus 1, when an input image from color camera 2 is input to layer section 4, the input image is separated into a foreground image and background image based on the depth information obtained from range finder 3 to be layered images.

Then, in image signal coding apparatus 1, sprite generating section 5 generates a background sprite image using separated background images. At this point, sprite generating section 5 fits the global motion model to the background image to calculate each parameter.

In this way, image signal coding apparatus 1 calculates parameters by fitting the global motion model to background images obtained by separating input images based on the depth information, instead of calculating parameters by directly fitting the global motion model to input images.

As a result, in image signal coding apparatus 1, it is possible to estimate global motion parameters in a background region with accuracy even when the foreground has a motion different from the background. In image signal coding apparatus 1, thus using accurate global motion parameters, pixel value calculating section 5D maps background field images in the background sprite image.

In this way, in image signal coding apparatus 1, since a background sprite image is generated based on global motion parameters with accuracy calculated only for the background image, it is possible to suppress image blurs occurring particularly around a boundary between the foreground and background even when the foreground has a motion different from the background.

Thus, according to the above configuration, a depth image from the same viewpoint as in an input image is acquired, and using the depth information, the input image is separated into a foreground image and background image as layered images, whereby it is possible to estimate global motion parameters with accuracy for the background region and to generate a background sprite image with no blurs even when there are objects with different motions in the foreground and background.

(Embodiment 2)

Figure 9:
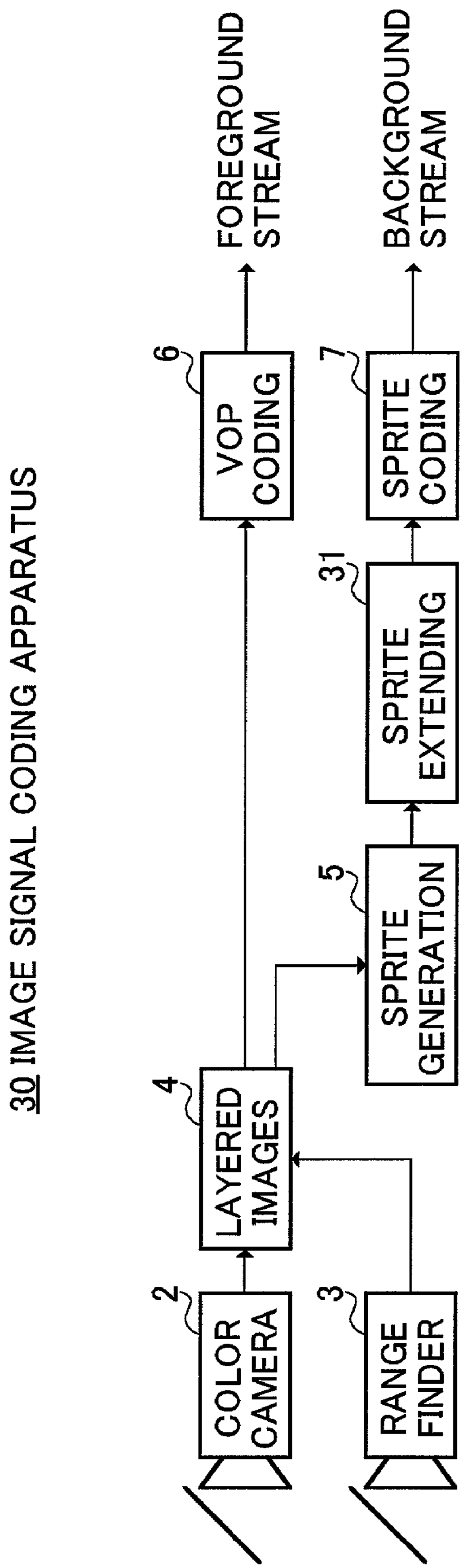
FIG. 9 is a block diagram showing a configuration of an image signal coding apparatus in Embodiment 2 of the present invention.

FIG. 9 shows a configuration of image signal coding apparatus 30 according to Embodiment 2 of the present invention with similar portions to FIG. 2 assigned the same reference numerals as in FIG. 2. Image signal coding apparatus 30 has the same configuration as that of image signal coding apparatus 1 in Embodiment 1 except that sprite extending section 31 is provided between sprite generating section 5 and sprite coding section 7.

Figure 10:
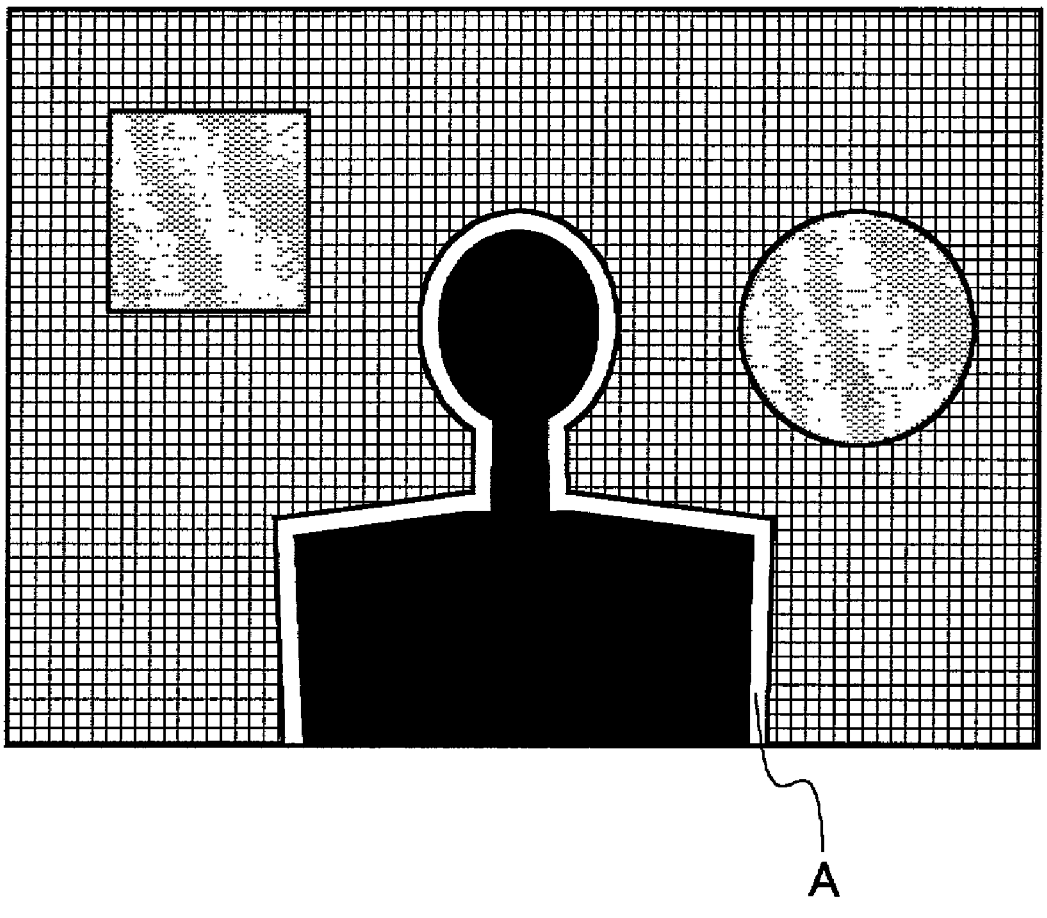
FIG. 10 is a diagram to explain extending processing of the background sprite image.

As shown in FIG. 10, in a background sprite image, with respect to a region in which pixel values are not written due to interception of foreground, when pixels in which pixel values are written exist in the vicinity of such a region (i.e., when a target pixel exists in a region indicated by "A" in FIG. 10), sprite extending section 31 extrapolates the pixel values at the pixel-value-written pixels and thereby extends the background sprite image.

By thus extending the background sprite image by one or two pixels, when a receiving side combines the background obtained by sprite decoding and foreground obtained by VOP decoding, it is possible to prevent an occurrence of pixel in which a pixel value is not written in the vicinity of a boundary between the foreground and background.

In other words, in the decoding in decoding apparatus 10 shown in FIG. 8, when sprite decoding section 12 transforms coordinates of part of background sprite image to generate a background image in each frame, a foreground image decoded in VOP decoding section 11 is multiplexed on the background image, and a decoded image is thereby generated, a case may occur where a pixel in which a pixel value is not written due to quantization error in coordinate transformation is generated in the vicinity of a boundary between the foreground and background. In such a case, image signal coding apparatus 30 prevents an occurrence of pixel in which a pixel value is not written.

Thus, according to the above configuration, by providing sprite extending section 31 which extrapolates a peripheral region in which pixels values are written to a region in which pixel values are not written due to interception of the foreground to write pixel values in the background sprite image, it is possible to prevent an occurrence of pixel in which a pixel value is not written in the vicinity of a boundary between the foreground and background when a receiving side combines the sprite-decoded background and VOP-decoded foreground.

(Embodiment 3)

Figure 11:
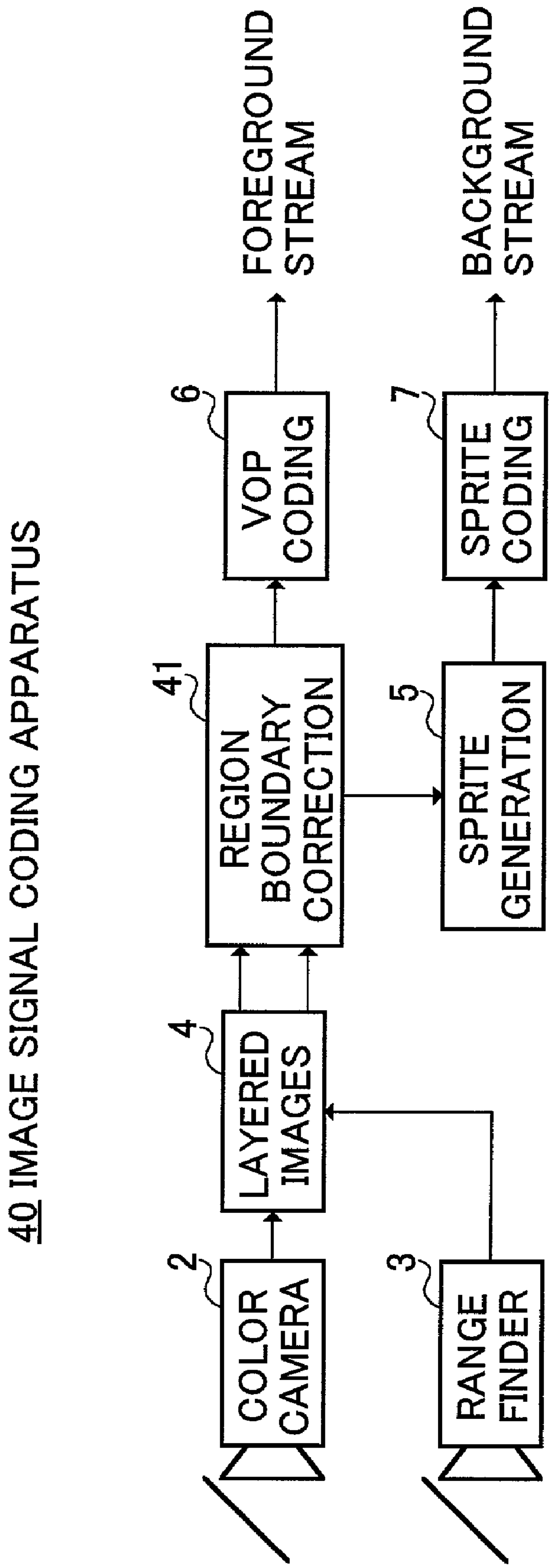
FIG. 11 is a block diagram showing a configuration of an image signal coding apparatus in Embodiment 3 of the present invention.

FIG. 11 shows a configuration of image signal coding apparatus 40 according to Embodiment 3 of the present invention with similar portions to FIG. 2 assigned the same reference numerals as in FIG. 2. In image signal coding apparatus 40, the foreground image and background image obtained in layer section 4 are input to region boundary correcting section 41.

Region boundary correcting section 41 extends the foreground edge by extending processing performed as a general image processing technique to correct the boundary between the foreground and background. FIG. 12 is an explanatory diagram for region boundary correcting processing. FIGS. 12A and 12B respectively show a foreground image and background image prior to the region boundary correction, and FIGS. 12C and 12D respectively show a foreground image and background image subjected to the region boundary correction. In FIGS. 12A and 12B, region A is separated erroneously as background despite region A being originally of foreground. Meanwhile, region B is separated erroneously as foreground despite region B being originally of background.

When the foreground region and background region have different motions, a region such as region A which is originally of foreground but separated erroneously as background causes a blur in the background sprite image. Meanwhile, a region such as region B which is originally of background but separated erroneously as foreground does not cause a blur in the background sprite image.

In performing VOP-coding on the foreground region, a region such as region B causes a coding amount to increase to some extent, but does not have effects on the image quality. Accordingly, the extending processing in region boundary correcting section 41 prevents a region originally of foreground to be separated erroneously as background, as shown in FIGS. 12C and D.

In addition, an amount (the number of pixels) to extend the foreground region may be determined corresponding to accuracy (i.e., volumes of regions A and B in FIG. 12) of the depth information.

Thus, according to the above configuration, even when a region which is originally of foreground is separated erroneously as background, by extending the foreground region to correct a position of the boundary between the foreground and background, it is possible to generate a background sprite image with no blurs.

Further, when region boundary correcting section 14 executes contraction processing first and then extending processing, it is possible to delete a noise-like fine foreground region, and to decrease a form coding amount in VOP layering.

Figure 13:
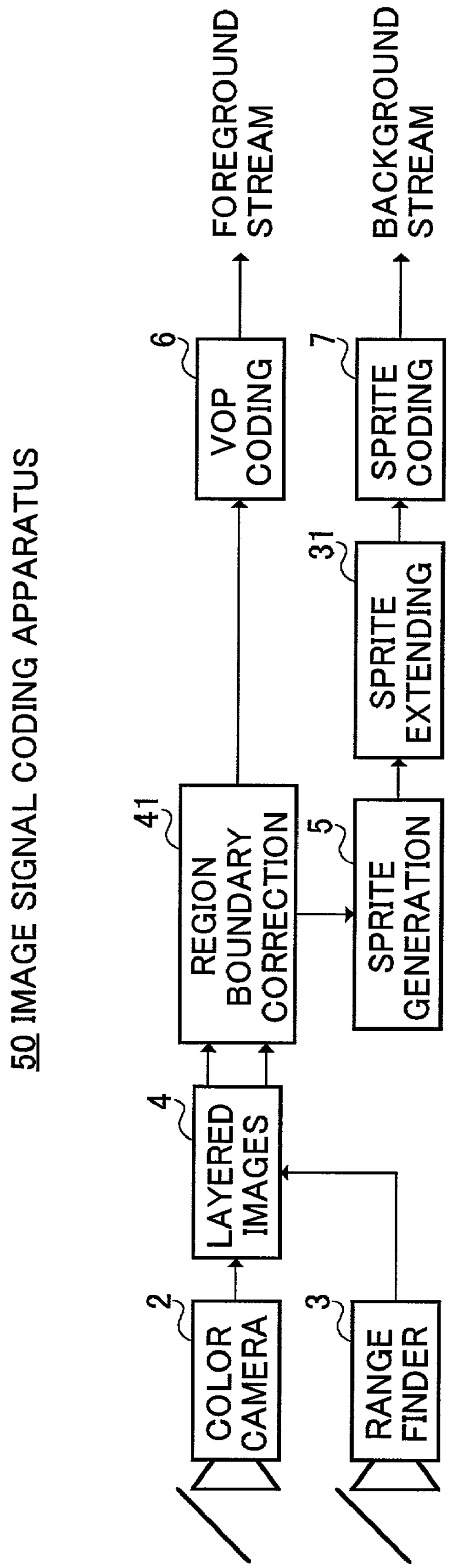
FIG. 13 is a block diagram showing a configuration of an image signal coding apparatus having both a region boundary correcting section and sprite extending section.

Furthermore, as shown in FIG. 13, a configuration having both region boundary correcting section 41 explained in Embodiment 3 and sprite extending section 31 explained in Embodiment 2 implements image signal coding apparatus 50 capable of preventing an occurrence of pixel in which a pixel value is not written around a boundary between the foregoing and background in decoding.

(Embodiment 4)

Figure 14:
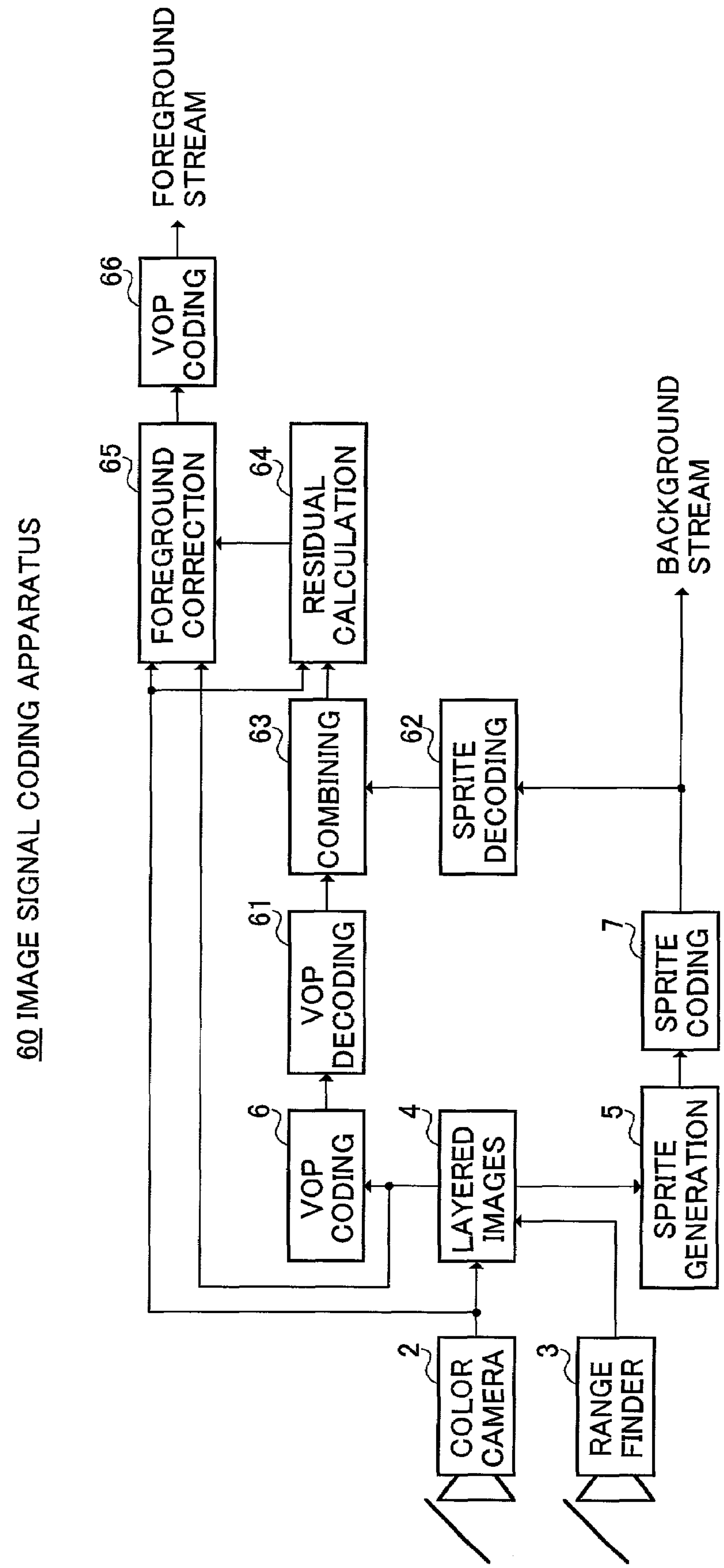
FIG. 14 is a block diagram showing a configuration of an image signal coding apparatus in Embodiment 4 of the present invention.

FIG. 14 shows a configuration of image signal coding apparatus 60 according to Embodiment 4 of the present invention with similar portions to FIG. 2 assigned the same reference numerals as in FIG. 2.

In image signal coding apparatus 60, a foreground stream generated in VOP coding section 6 and background stream generated in sprite coding section 7 are respectively input to VOP decoding section 61 and sprite decoding section 62. VOP decoding section 61 and sprite decoding section 62 perform local decoding respectively on the foreground stream and background stream, and output respective local decoded data to combining section 63.

The local decoded data combined in combining section 63 is output to residual calculating section 64. Residual calculating section 64 calculates a residual between the local decoded data and the input image output from color camera 2. Examples calculated as the residual are an absolute value of intensity difference, square of intensity difference, absolute sum of difference between RGB values, square sum of difference between RGB values, absolute sum of difference between YUV values and square sum of difference between YUV values.

Foreground correcting section 65 receives as its inputs the input image from color camera 2, foreground image from layer section 4 and residual from residual calculating section 64, and adds a region with a residual more than or equal to a predetermined threshold to the foreground region. Herein, decreasing the threshold increases a coding amount but improves the transmission image quality, while increasing the threshold decreases the image quality to some extent but suppresses a coding amount.

VOP coding section 66 performs VOP coding on the foreground image corrected in foreground correcting section 65 to output as a foreground stream.

Thus, according to the above configuration, it is possible to implement image signal coding apparatus 60 which corresponding to error (residual) caused by layer coding, adds a region with a large error to foreground, thereby corrects the foreground region to perform coding, and thus improves the image quality of an image to transmit.

(Other Embodiments)

In addition, above-mentioned Embodiment 4 describes the case of comparing a residual with a predetermined threshold, and adding a region with the residual more than or equal to the threshold to foreground, but the present invention is not limited to the above case. Instead of simply adding a region with the residual more than or equal to the threshold to a foreground region, it may be possible to perform residual suppression processing (fine region eliminating processing) that is a well-known technique to add to the foreground region. In this way, without greatly degrading subjective image quality, it is possible to suppress increases in shape information (i.e., increases in coding amount) of the foreground region due to the foreground correction.

Further, while above-mentioned embodiments describe the case of performing VOP coding on a foreground image, the present invention is not limited to the above case. A case may be possible of writing specific pixel values (for example, (R,G,B)=(0,0,0)) indicative of background in a foreground image, performing coding and decoding without using shape information in MPEG 2 etc., and combining the foreground and background according to the specific pixel values in combining the foreground and background. In this case, even when other coding processing is performed instead of VOP coding, it is possible to obtain the same effects as in the above-mentioned embodiments.

Furthermore, while the above-mentioned embodiments describe the case of using a range finder as depth image obtaining means, the present invention is not limited to the above case. It may be possible to use a stereo camera or multi-viewpoint camera, in other words, any camera capable of shooting a color image and depth image from the same viewpoint may be used.

Still furthermore, while the above-mentioned embodiments describe the case of using affine transformation in generating a background sprite, the present invention is not limited o the present invention. It may be possible to execute other transformation such as viewpoint-projection transformation or weak viewpoint-projection transformation to generate a background sprite.

Moreover, while the above-mentioned embodiments explain the present invention as aspects of an apparatus and method, the present invention is applicable as a storage medium storing the above method as a program.

An image signal coding method of the present invention has an image input step of inputting an input image to be encoded, a depth image obtaining step of obtaining a depth image from the same viewpoint as in the input image, a layer step of separating the input image into a foreground image and a background image as layered images using depth information of the depth image obtained in the depth image obtaining step, a coding step of coding foreground images, a background sprite generating step of generating a background sprite image from background images, and a sprite coding step of coding the background sprite image.

According to the method, even when the foreground has a motion different from the background, by separating an input image into a foreground region and background region as layer images using the depth information, it is possible to estimate global motion parameters in the background region with accuracy, and to generate a background sprite image with no blurs.

The image signal coding method of the present invention further has a background sprite extending step of extending a background region of the background sprite image generated in the background sprite generating step.

According to the method, even when there is a region in which pixel values are not written due to interception of foreground in the background sprite image, since the background region in the background sprite image is extended, it is possible to prevent an occurrence of pixel in which a pixel value is not written in the vicinity of a boundary between the foreground and background in the decoded image.

The image signal coding method of the present invention further has a region boundary correcting step of extending a foreground region generated in the layer step, and thereby correcting a position of a region boundary between the foreground image and the background image.

According to the method, even when a region which is originally of foreground is separated erroneously as background, by extending the foreground region to correct a position of the boundary between the foreground and background, it is possible to generate a background sprite image with no blurs.

The image signal coding method of the present invention further has a first local decoding step of performing local decoding on coded data generated in the coding step, a second local decoding step of performing local decoding on coded data generated in the sprite coding step, a residual calculating step of obtaining a residual between the input image and a decoded image resulting from the first decoding step and the second decoding step, and a foreground correcting step of adding a pixel with a large residual to foreground and thereby correcting the foreground.

According to the method, by adding a region with a large residual caused by generating layered images to encode, it is possible to improve the image quality of an image to transmit The image signal coding method of the present invention further has a residual suppression step of not adding to foreground a region with an area thereof less than a second threshold among regions with a residual from the input image more than a first threshold.

According to the method, without greatly degrading subjective image quality, it is possible to decrease increases in shape information (i.e., increases in coding amount) of the foreground region due to the foreground correction.

In the image signal coding method of the present invention, VOP coding is performed on the foreground image in the coding step.

An image signal coding apparatus of the present invention has an image input section that inputs an input image to be encoded, a depth image obtaining section that obtains a depth image from the same viewpoint as in the input image, a layer section that separates the input image into a foreground image and a background image as layered images using the depth image, a coding section that encodes foreground images, a background sprite generating section that generates a background sprite image from background images, and a sprite coding section that encodes the background sprite image.

A storage medium of the present invention is a computer readable storage medium storing an image signal coding program having an image input procedure of inputting an input image to be encoded, a depth image obtaining procedure of obtaining a depth image from the same viewpoint as in the input image, a layer procedure of separating the input image into a foreground image and a background image as layered images using depth information of the depth image, a coding procedure of coding foreground images, a background sprite generating procedure of generating a background sprite image from background images, and a sprite coding procedure of coding the background sprite image.

A program of the present invention makes a computer execute an image input procedure of inputting an input image to be encoded, a depth image obtaining procedure of obtaining a depth image from the same viewpoint as in the input image, a layer procedure of separating the input image into a foreground image and a background image as layered images using depth information of the depth image, a coding procedure of coding foreground images, a background sprite generating procedure of generating a background sprite image from background images, and a sprite coding procedure of coding the background sprite image.

The present invention is not limited to the above described embodiments, and various variations and modifications may be possible without departing from the scope of the present invention.

This application is based on the Japanese Patent Application No. 2001-203830 filed on Jul. 4, 2001, entire content of which is expressly incorporated by reference herein.

What is claimed is:

1. An image signal coding method for generating a sprite image from moving images, the method comprising:
- inputting an image to be encoded;
- obtaining a depth image from the same viewpoint as the input image;
- separating the input image into a foreground image and a background image as layered images using depth information of the depth image;
- coding the foreground image;
- generating a background sprite image from the background image; and
- coding the background sprite image.

2. The image signal coding method according to claim 1, further comprising:
- extending a background region of the background sprite image.

3. The image signal coding method according to claim 1, further comprising:
- extending the foreground region, and thereby correcting a position of a region boundary between the foreground image and the background image.

4. The image signal coding method according to claim 1, further comprising:
- performing local decoding on coded data generated in coding the foreground image;
- performing local decoding on coded data generated in coding the background sprite image;
- obtaining a residual between the input image and a decoded image resulting from the local decoding on coded data generated in coding the foreground image and the local decoding on coded data generated in coding the background sprite image; and
- adding a pixel with a large residual to the foreground and thereby correcting the foreground.

5. The image signal coding method according to claim 4, further comprising:
- not adding to the foreground image a region among regions with a residual from the input image more than a first threshold.

6. The image signal coding method according to claim 1 wherein, in coding the foreground image, VOP coding is performed on the foreground image.

7. An image signal coding apparatus that generates a sprite image from moving images, the apparatus comprising:

an image inputter that inputs an image to be encoded;

a depth image obtainer that obtains a depth image from the same viewpoint as the input image;

an image separator that separates the input image into a foreground image and a background image as layered images using depth information of the depth image;

a foreground coder that encodes the foreground image;

a background sprite generator that generates a background sprite image from the background image; and a sprite coder that encodes the background sprite image.

8. A computer readable storage medium storing an image signal coding program, the program comprising:

an input procedure of inputting an image to be encoded;

a depth image obtaining procedure of obtaining a depth image from the same viewpoint as the input image;

a layer procedure of separating the input image into a foreground image and a background image as layered images using depth information of the depth image;

a coding procedure of coding the foreground image;

a background sprite generating procedure of generating a background sprite image from the background image; and a sprite coding procedure of coding the background sprite image.

9. A program for use in making a computer execute:

an input procedure of inputting an image to be encoded;

a depth image obtaining procedure of obtaining a depth image from the same viewpoint as in the input image;

a layer procedure of separating the input image into a foreground image and a background image as layered images using depth information of the depth image;

a coding procedure of coding the foreground image;

a background sprite generating procedure of generating a background sprite image from the background image; and a sprite coding procedure of coding the background sprite image.

10. The image signal coding method according to claim 5, wherein the region that is not added has an area less than a second threshold.

* * * * *